Figure 1:
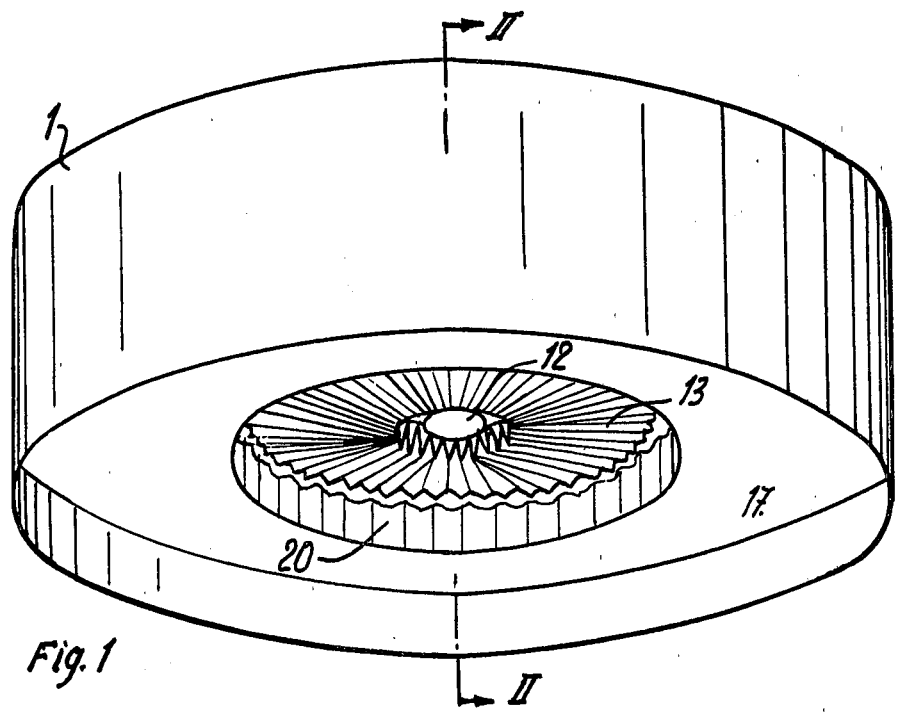

United States Patent [19]

de Castella

[11] 4,411,675

[45] Oct. 25, 1983

[54] APPARATUS FOR THE PURIFICATION OF GASES

[76] Inventor: Pierre de Castella, La Vuachere, Monnaz, Switzerland, 1111

[21] Appl. No.: 289,797

[22] Filed: Aug. 3, 1981

[51] Int. Cl.³ ............................................ B01D 50/00
[52] U.S. Cl. ....................................... 55/316; 55/279;
   55/317; 55/320; 55/473; 55/DIG. 36; 98/115
   R; 422/122; 422/124
[58] Field of Search ................................. 55/316–317,
   55/401, 400, 473, 279, 320, 325, DIG. 36;
   98/115 R; 422/122, 124

[56] References Cited

U.S. PATENT DOCUMENTS

| | | | |
|---|---|---|---|
| 998,889 | 7/1911 | Fraser | 55/400 X |
| 1,794,447 | 3/1931 | de Bothezat | 55/473 |
| 2,620,722 | 12/1952 | Owens | 55/473 X |
| 2,889,007 | 6/1959 | Lunde | 55/DIG. 36 X |
| 2,994,407 | 8/1961 | van Diepenbrock | 55/400 X |
| 3,018,896 | 1/1962 | Gewiss | 55/400 X |
| 3,243,527 | 3/1966 | Sternheim | 55/279 X |
| 3,676,985 | 7/1972 | Foreman et al. | 55/317 |

FOREIGN PATENT DOCUMENTS 2901448  7/1979  Fed. Rep. of Germany ........ 55/400

*Primary Examiner*—Kathleen J. Prunner
*Attorney, Agent, or Firm*—Mallinckrodt & Mallinckrodt

[57] ABSTRACT

An imperforate duct has fluid-inlet and fluid-outlet openings at opposite ends thereof, between which is located a rotor that performs both a ventilating function and a filtering function by way of imperforate, rough surfaces which are adapted to retain solid and liquid particles contained in air or other gas that is being filtered, the rotor being followed by a gas-treating filter through which the fluid passes before emerging from the hood. An aerodynamic block against backflow is located between the inlet opening and the rotor, but not in contact with the rotor.

6 Claims, 3 Drawing Figures

U.S. Patent   Oct. 25, 1983   Sheet 1 of 2   4,411,675

APPARATUS FOR THE PURIFICATION OF GASES

The invention relates to duct means, i.e. a hood, for filtering gaseous fluids comprising an outer frame, a motor, which drives a rotor, acting both as a fan and as a device for filtering the gaseous fluid which it draws into the hood, the rotor being followed by a filter traversed by the flow of gaseous fluid and adapted to neutralize or convert extraneous gaseous components still contained in the fluid.

Hoods for filtering gaseous fluids are generally constructed on the principle of forced passage of the fluid, under the action of a fan, through one or more filters arranged in series in the hood. There also exist electrostatic separators in which the gaseous fluid, drawn in by a fan, moves through a set of electrodes, charged with static electricity, on which impurities become deposited. In the first case, the filters which retain the impurities are saturated quite rapidly, and they then have to be cleaned or replaced in order to continue to fulfil their function. Similarly, in the second case, the electrodes have to be frequently cleaned so as to prevent breakdown of the electric circuit or the production of harmful gas.

The object of the present invention is to remove these drawbacks and to provide a hood in which filtration of the gaseous fluid is carried out in two stages, namely: first, the retention of solid and liquid particles of all dimensions on the surfaces of the rotor without passing through it, and then neutralization of the unrequired gaseous components by a gas-treating filter located at the outlet of the hood.

There is thus a first period for the physical filtering of all the solid and liquid particles in suspension in the fluid to be treated, and this is followed by neutralization, conditioning of the fluid, or chemical filtering of the harmful gases in a filter suited for the purpose.

The hood in accordance with the invention is characterized in that the rotor is placed at the inlet of the hood to perform both a blowing function and a filtering function by means of alternating skew surfaces and/or planar surface portions forming angles between them so as to set up turbulent flow of the gaseous fluid which they displace and to constrain said fluid to sweep lightly over the said surfaces without passing through them. In a preferred embodiment, the rotor takes the form of a radially corrugated disc and it is made of a fibrous material having rough surfaces. The degree of contamination of the surfaces of the rotor can be determined at all times since they are not traversed by the impurities which they retain. When saturated with impurities, the rotor is replaced in the normal way and is destroyed; it may also be made of a solid washable material, but washing certainly costs more than the price of a new rotor.

Pressure losses occurring when the gaseous fluid is drawn into the hood of the invention are very low since the fluid to be filtered flows freely into the hood as soon as the rotor is started up. Consequently, it is possible to make use of low-power and low-speed motors for driving the rotor. For a given throughput, the hood will be less noisy and more economical in consumed power as compared with the conventional hoods which effect filtering by means of filters through which the gaseous fluid flows.

To prevent backflow of the pressurized fluid into the hood due to movement of the rotor, means providing an aerodynamic block against backflow is fitted in an opening through which the gaseous fluid enters the hood, the arrangement being such that such means extends along a portion of the periphery of the rotor without touching it. Such means is in the form of a fluted strip forming a ring which surrounds the inlet opening of the hood, or it takes the form of a smooth frustoconical surface, wherein the area of the intake orifice is smaller than the area of the rotor. This aerodynamic block is designed to oppose backflow of the gaseous fluid through the intake orifice of the hood.

The filter placed at the outlet of the hood of the invention is traversed by a stream of gaseous fluid from which are physically filtered the solid and liquid particles that it carries to the inlet to the hood. Consequently, this filter is prevented from being affected by these polluting substances. The filter may be impregnated with a reagent aimed at neutralizing or converting the extraneous gaseous components still contained in the fluid to be filtered. This reagent may be constituted by a chemical agent for impregnating the filter, water or water vapour for moistening the filtered gaseous fluid, perfume or a deodorant, etc. For the purpose of neutralizing cooking odours, this filter is formed by a bed of granulated wood-carbon, the efficiency of which does not change even after three years of use, because of the efficient protection afforded by the rotor which holds back water vapour and greases in a perfect manner.

The hood in accordance with the invention is light in weight and does not occupy much space. It requires no pipework, and only a pick-up for low voltage monophase current is needed for supplying it. By permitting recycling of the filtered and deodorized fluid into the surrounding air, this hood does not cause any loss of heat in the room in which it is installed. The filter placed in the upper portion of the hood surface practically no contamination, since the particles that contaminate the filters of the prior-art hoods are retained on the surfaces of the adsorbing rotor. Consequently, the hood operates much more efficiently than the conventional hoods.

The attached drawings illustrate, by way of example, one form of construction of a hood for filtering gaseous fluids in accordance with the invention.

Figure 2:
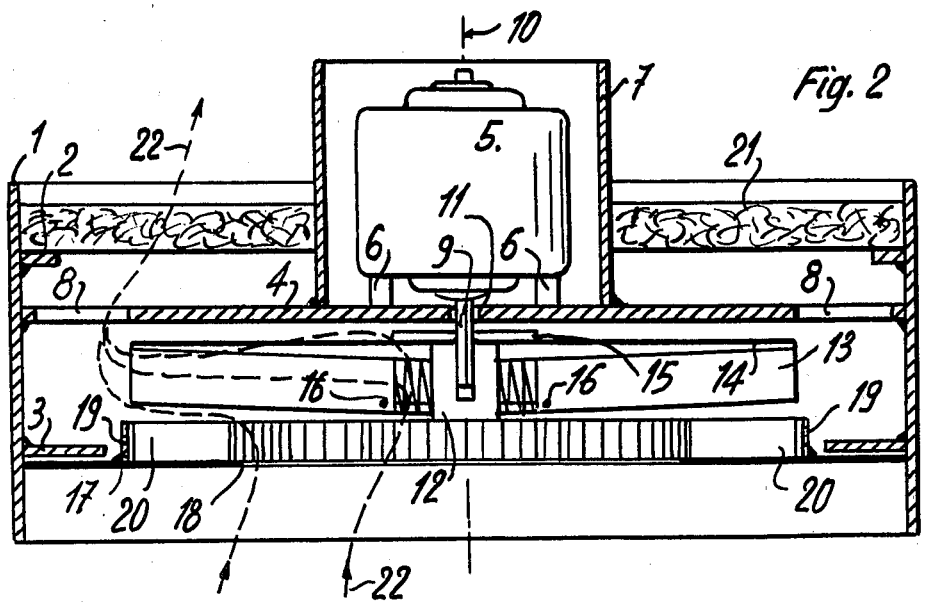
Figure 3:
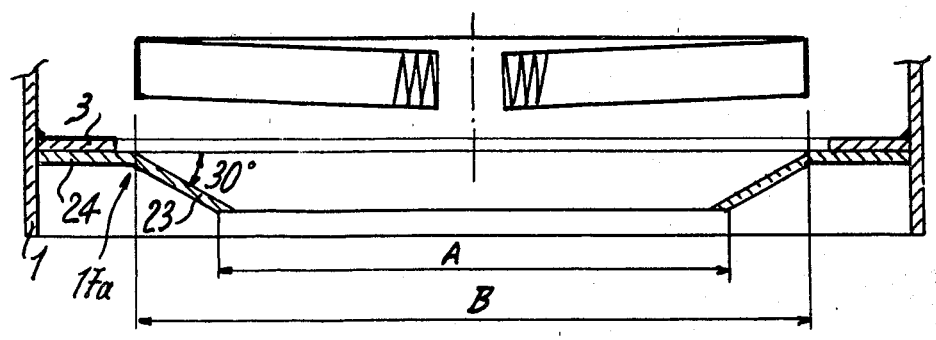

In the drawings:

FIG. 1 is a perspective underneath view of one form of construction of a filtering hood, FIG. 2 is a section through the hood along line II–II of FIG. 1, and FIG. 3 is a cross-section through a modified form of the lower part of the hood of FIG. 2.

The hood for the filtering of gaseous fluids illustrated in FIGS. 1 and 2 of the attached drawings comprises an imperforate duct 1 shown as circular in form having two rings or annular imperforate shelves 2 and 3 (FIG. 2) interiorally thereof which serve to support inner parts described below, and having its ends open to provide a duct inlet at one end and a duct outlet at its opposite end. Secured between the rings 2 and 3 is a circular base-plate or wall 4 which forms the horizontal reinforcing member of the hood and on which is secured a motor 5 by means of fixing lugs 6. A protective cylinder 7 is fitted around the motor 5 and is secured to the plate 4. The plate 4 has openings 8 which are evenly spaced along its periphery and are located adjacent the inner surface of the circular duct 1. The rings 2 and 3 and the plate 4 are secured to the duct 1 by welding; the protective cylinder 7 is secured to the plate 4, also by welding. The parts 2, 3, 4 and 7 may of course be connected together by any other known means, for example riveting, bonding etc., or they may be formed integrally with the circular duct 1 in the case where the hood is produced by moulding. The body of the hood, formed by the parts 1, 2, 3, 4 and 7, may be made of sheet-metal, light-metal or a plastics material. It will be obvious to the expert that the duct 1 may also be of square shape, for example, so that it can be nested in a prefabricated module system as used, for example, for equipping kitchens or laboratories.

The motor 5 has a shaft 9, the axis of which coincides with the vertical axis of symmetry 10 of the hood illustrated in the drawing. The shaft 9 of the motor 5 passes through the plate 4 at 11 and, at its free end, has a locking sleeve 12 on which is secured a corrugated, substantially imperforate, gas-motivating rotor 13 by way of a circular plate 14 which is secured to a collar 15 integral with the sleeve 12.

The corrugated rotor 13 takes the form of a corrugated disc having a central opening, the diameter of which is greater than that of the sleeve 12 on which the corrugated disc is centered. The central opening of the corrugated disc is held at a constant diameter by a wire shown at 16 and adjacent the opening and extending through all the corrugations of the rotor 15. The corrugated disc is secured at its periphery on the plate 14 by any suitable known means such as bonding, riveting etc. The corrugated disc may be made of any thin material having rough surfaces. In one embodiment, it is made from a cellulose paper having a rough surface, such as a blotting paper. In other variants it can be made from all types of fibre (cotton, wool, polyester, glass) which are agglomerated or woven in such a way as to form a rough sheet. It may also be made of an agglomerate of metallic fibres or filaments or from a thin sheet, on the faces of which a thin agglomerated layer of wool or metallic filaments is provided. In a further variant, the rotor or corrugated disc 13 may be formed from a honeycombed plastics material. The expert will readily appreciate that the material used for producing the rotor 13 must have a single important characteristic: it must have a rough surface having pronounced uneven areas on which the liquid and solid particles suspended in the gaseous fluid to be filtered by means of the hood will be able to cling and become fixed.

The plate 14 may also be made of the same material as the corrugated disc 13 and may form, with said disc, a removable assembly. In the case where the plate 14 is simply to be a supporting part, it should have latching means, not illustrated, to enable the corrugated disc to be secured, or it may be secured by the material sold under the trademark VELCRO.

A removable base 17 in the form of an annulus, having a circular central opening 18 is fitted against the ring or shelf 3 of the duct 1 adjacent to the inlet end of the duct and is removably secured thereto by means not illustrated. THe removable base 17 has, on its upper surface, a cylindrical part 19 which is concentric with the opening 18 and is intended to retain a folded, fluted strip 20, the two ends of which are connected to each other to form a ring as an annular extension of ring or shelf 3, extending inwardly of duct 1 and toward its axis, so as to provide an aerodynamic block. Such strip may be made from the same material as the rotor 13. As shown in the drawing, it covers a portion of the periphery of the rotor 13 without touching said rotor. Like the rotor, it can be replaced after the removable base has been removed.

In the variant illustrated in FIG. 3, the removable base 17a takes the form of a frusto-conical part 23, surrounded by a ring 24 fitted against the ring or shelf 3 of duct 1, so that part 23 becomes, in effect, an extension of such shelf 3 extending inwardly of duct 1 and toward the axis thereof. The ring 24 has approximately the same diameter B as the rotor, and the lower end of the frusto-conical part 23 is of smaller diameter and constitutes a central circular opening having a diameter A through which the gaseous fluid enters the hood. The vertical dimension of the frusto-conical part is such that its solid walls form an angle of approximately 30° with the ring 24. This removable base performs the same function as and replaces the aerodynamic block of FIG. 2 in that it forms, below the rotor, a turbulence chamber which promotes deposition of impurities on the surface of the rotor. The diameter A of the central circular opening should be equal to or less than 0.75 times the diameter B of the part 23.

Fitted at the top of the hood and against the ring 2 is a standard filter 21 designed, for example, to effect chemical neutralization of toxic gaseous particles contained in the fluid to be filtered, or intended to neutralize unpleasant odours or to retain any particles which do not become fixed on the corrugated rotor.

The hood for filtering gaseous fluids that has been described by reference to FIGS. 1 and 2 functions in the following manner:

To bring the hood into operation, the motor 5 is started up and this causes the corrugated disc 13 to rotate. While rotating, the corrugated disc 13 acts like the helix of a fan, i.e. it causes the fluid that is to be filtered to circulate through the hood. The gaseous fluid is consequently drawn through the opening 18 in the base 17, passes along the surfaces of the corrugated disc 13 along the line indicated at 22, without passing through these surfaces, passes through the inlets 8 formed in the plate 4 supporting the motor 5, and then moves into the space formed below the conventional filter 21. The rotor or corrugated disc 13 causes mixing of the gaseous fluid that is to be filtered, and draws said fluid into the hood in a turbulent flow. This turbulent flow moves along the folds of the corrugated disc without passing through them, and moves into contact with the rough surface of said disc where the solid and liquid particles are retained by adsorbtion. THe corrugated disc or rotor 13 then, in addition to its ventilating function, performs a filtering function by retaining the solid and liquid particles which attach themselves to its rough surface. The rotor can then become loaded with impurities without losing its efficiency, and the partially filtered fluid, from which, in particular, solid and liquid particles have been removed, is able to pass through the conventional filter 21 in the direction indicated by the arrow 22 without blocking said filter 21 which will generally be of the type suitable for effecting chemical filtration of the fluid. It will therefore be impregnated with suitable chemical substances selected in accordance with the gases that these substances are adapted to neutralize or fix. The advantage of the hood that has been described resides in the combination of the two filters, i.e. the adsorbent corrugated rotor designed to effect initial filtration of the liquid and solid pollutants, and a second conventional filter through which the fluid will be able to pass without the risk of this filter becoming blocked too quickly, since the initial filtering has already taken place with the aid of the rotor 13.

The fixed aerodynamic block 20, fitted between the rotor 13 and the intake opening 18, performs a particularly important function. As mentioned above, it partially covers the periphery of the rotor 13 (approximately one quarter of the radius of this rotor) without however, touching it. This block 20, normally made of the same material as the rotor 13, is replaceable as is the rotor, and it prevents backflow of the air that has been drawn in and thus enables a certain pressure to be set up within the hood, which pressure causes the gaseous fluid to pass through the conventional filter 21 and to leave the hood at a satisfactory rate.

This fixed aerodynamic block 20 is corrugated, and its corrugations are arranged radially in relation to the intake opening, but they do not touch the rotor 13. This fixed corrugated block may be replaced by a succession of straight sheets, or sheets having V-shaped or S-shaped corrugations or corrugations of any other shape that opppose back flow of the fluid towards the exterior of the hood.

A prototype of the hood described by reference to FIGS. 1 and 2 has been made up for use as a hood for recycling air in kitchens. This prototype was constructed to meet the official standards as regards space occupied and as applied to existing hoods; this prototype was tested. It was equipped with a 90 watt 220 volt motor for driving an adsorbent rotor having an outside diameter of 400 mm and turning at speeds variable within the range 500 and 1200 rpm. The aerodynamic block 20 had an inside diameter of 350 mm and an outside diameter of 400 mm. The air entered the hood at a speed of approximately 2 m/second and the hood discharged at a rate of 600 m$^3$ per hour. THe filter 21 consists of a bed of agglomerated activated carbon having a volume of 3 liters over a surface of 0.22 m$^2$ and located at the top of the hood. It resulted in complete deodorization of vapours resulting from cooking, so that no inconvenience was caused by allowing the air to escape into the kitchen. The filtration of liquid and solid components (water, soot, grease etc.) was achieved by means of the corrugated rotor 13 and the aerodynamic block 20 made of replaceable blotting paper.

The lower opening 18 of the hood enables the corrugated rotor 13 and the aerodynamic block 20 to be inspected. It is thus possible to check at a glance the degree of contamination of the rotor and the block which can then be replaced by standard components when saturated, i.e. when the corrugations are filled with dust and greasy material. This operation does not need to be carried out more than three or four times a year in cases where a hood is used in the normal manner in a private household. Since the rotor is made of a paper-based material, its destruction poses no problem.

Flammability tests on this rotor, not protected against burning and located above a fryer or a kitchen stove, were carried out and indicated that when the rotor was turning, the flames reaching it could not set fire to the hood. Rotation of the rotor prevents the flame from igniting its surfaces even if saturation with grease. During the tests that were carried out, it was impossible to ignite the rotor. This fact constitutes a considerable advantage since in conventional hoods equipped with metal fire-resisting grills, the latter become rapidly contaminated and it is necessary to wash them frequently so as to prevent a considerable reduction in the inflow of air.

For the same throughput of air, the above-described hood and its 90 watt motor use less power than that required for overcoming the pressure-losses occurring across the conventional filters that are used in the prior-art hoods and that become progressively clogged.

The above-described hood may also be used for moistening the air. Then, all that is required is to fit a vaporizing means or simply to moisten a filter, such as the filter 21, and then to rotate the hood which has the advantage of being able to remove dust from the air and to disinfect it prior to moistening, without the constant need for changing or washing the filters lying in the path of the air, as is the case with the prior-art apparatus.

A further form of construction has been developed for filtering the air surrounding an autogenous welding station. In this example, the particles of soot became attached to the rotor, whereas the metallic oxides were neutralized by the filter 21. Since the fumes from the welding operations were totally filtered, it was no longer necessary to discharge the air into the outside surroundings, and this represents a considerable saving in thermal energy and in capital outlay.

The release of styrol vapours during the manufacture of moulded polyester parts reinforced with glass fibres is harmful. Face masks containing filters consisting of activated carbon are unpleasant to wear and they become rapidly blocked by the glass fibres. The provision and installation of a hood in accordance with the present invention has enabled dust, glass fibres and styrol aerosols to be trapped on the rotor 13, and the styrol vapours to be neutralized by the filter 21 consisting of activated carbon, efficiency being greater than 90%. Air filtered in this way can be recycled into the workshop without inconvenience.

Other tests have been carried out in connection with applications for medical and hospital purposes. Using a hood similar to that described by reference to FIGS. 1 and 2, it was found that it is possible rapidly to reduce the rate of bacterial contamination in a building and to keep it within the acceptable limits of permanent contamination, while at the same time neutralizing odours by means of a filter consisting of activated carbon.

In the embodiments mentioned above, a radially corrugated rotor has been illustrated and described which comprises corrugations starting at a centre and extending radially towards the periphery of the rotor. It is obvious that this corrugated rotor can be replaced by other rotors which are similar, for example, to the arrangements described in earlier patents, and particularly by a corrugated rotor consisting of several stages, or by a rotor comprising ducts formed between two flat discs. As a variant, any rotor having alternating skew surface portions, or planar surface portions forming angles between them and adapted to set up turbulent flow in the gaseous fluids that they displace is suitable and relatively efficient, provided of course that the surfaces of the rotor are rough so as to enable them to retain and fix the solid and liquid particles. The same is true as regards the fixed aerodynamic block fitted around the rotor and the opening whereby the gaseous fluid is drawn into the hood.

It has been stated above that the filter 21 could be soaked with water by means of a suitable device and that the hood could act as a humidifier in a living room, it being understood that the humidified air will have been previously filtered by the action of the rotor.

As a variant, the filter 21 may also be impregnated with a perfume or a substance for neutralizing odours, or said filter could be impregnated with a germicide.

The filter 21 may also be made from a solid honeycombed body held at a temperature suitable for heating or cooling the air emitted from the hood. This apparatus becomes a complete air-conditioning unit since it is capable of filtering the surrounding air so as to remove solid, liquid and gaseous polluants therefrom, or humidifying or drying the filtered air, and of heating it or cooling it as required. This series of operations is carried out almost noiselessly and without the use of excessive energy.

I claim:

1. Apparatus for the filtering of gases, comprising a duct having imperforate walls, an inlet opening adjacent to one end of the duct for a gas to be purified, and an outlet opening at the opposite end of the duct; a filter extending entirely across said outlet opening through which gas to be discharged from the duct must pass; a gas-motivating rotor disposed across said inlet opening and spaced therefrom inwardly of the duct; a wall extending across the duct inwardly thereof from the rotor, with openings about its peripheral margin for the passage of inflowing gas to the filter, said rotor being formed as a substantially imperforate disc having gas-contacting surfaces adapted to pick up and retain particulate matter carried by the gas; means supported by said wall for rotating the rotor; means disposed peripherally of the inlet opening for substantially preventing flow through the duct peripherally of the inlet opening; and means for providing an aerodynamic block against backflow of gas from the interior of the duct between the filter and the rotor, said means for preventing flow through the duct comprising an imperforate shelf, and said means for producing an aerodynamic block defining the inlet opening and comprising a replaceable ring of material supported by said shelf and having surface area for the removal of particulate matter from the inflowing gas to be filtered, said ring of material being a strip folded transversely of its length to provide flutes.

2. Apparatus in accordance with claim 1, wherein the ring of material is covered by the peripheral margin of the rotor.

3. Apparatus in accordance with claim 1, wherein the rotor is radially corrugated.

4. Apparatus in accordance with claim 1, wherein the filter is of a type that chemically conditions the gas passing therethrough.

5. Apparatus for the filtering of gases, comprising a duct having imperforate walls, an inlet opening adjacent to one end of the duct for a gas to be purified, and an outlet opening at the opposite end of the duct; a filter extending entirely across said outlet opening through which gas to be discharged from the duct must pass; a gas-motivating rotor disposed across said inlet opening and spaced therefrom inwardly of the duct; a wall extending across the duct inwardly thereof from the rotor, with openings about its peripheral margin for the passage of inflowing gas to the filter, said rotor being formed as a substantially imperforate disc having gas-contacting surfaces adapted to pick up and retain particulate matter carried by the gas; means supported by said wall for rotating the rotor; means disposed peripherally of the inlet opening for substantially preventing flow through the duct peripherally of the inlet opening; and means for providing an aerodynamic block against backflow of gas from the interior of the duct between the filter and the rotor, said duct being in the form of a hood for positioning above a source of gas to be filtered, said means for preventing flow through the duct comprising an imperforate shelf, and said means for providing an aerodynamic block defining the inlet opening and comprising a shelf extension having its inner peripheral margin sloping outwardly of the duct and toward the axis of the inlet opening at an angle of approximately thirty degrees.

6. Apparatus in accordance with claim 5, wherein the inlet opening and the inner peripheral margin of the shelf extension are circular and the diameter of the former is substantially no greater than three-quarters the outer diameter of the latter.

* * * * *